Sept. 30, 1952     B. J. DROZINSKI     2,612,332
AIRPLANE BRAKE
Filed Aug. 17, 1948     2 SHEETS—SHEET 1
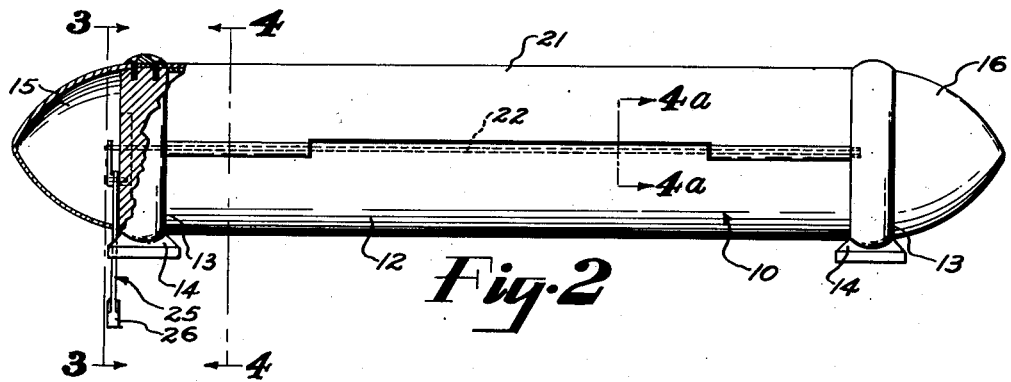
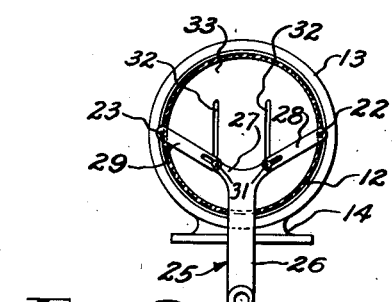
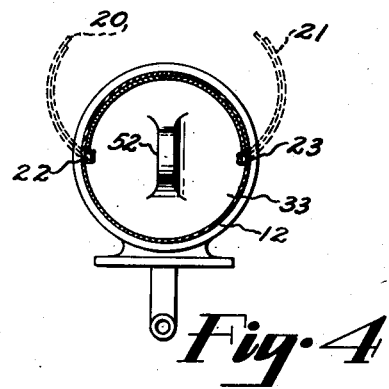
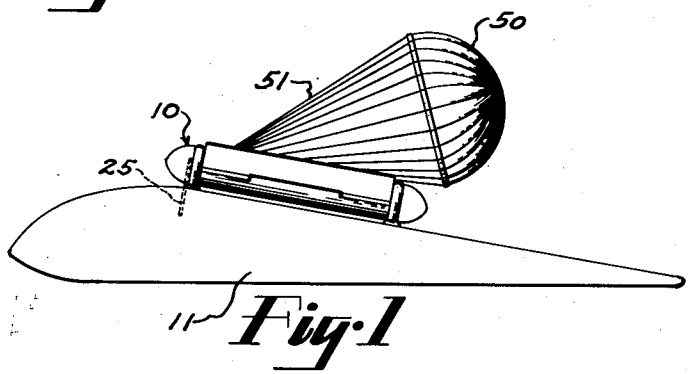
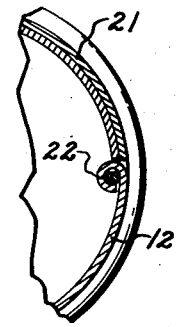
INVENTOR.
BRONISLAW J. DROZINSKI
BY Fay, Golrick & Fay
ATTORNEYS Sept. 30, 1952   B. J. DROZINSKI   2,612,332
AIRPLANE BRAKE
Filed Aug. 17, 1948   2 SHEETS—SHEET 2
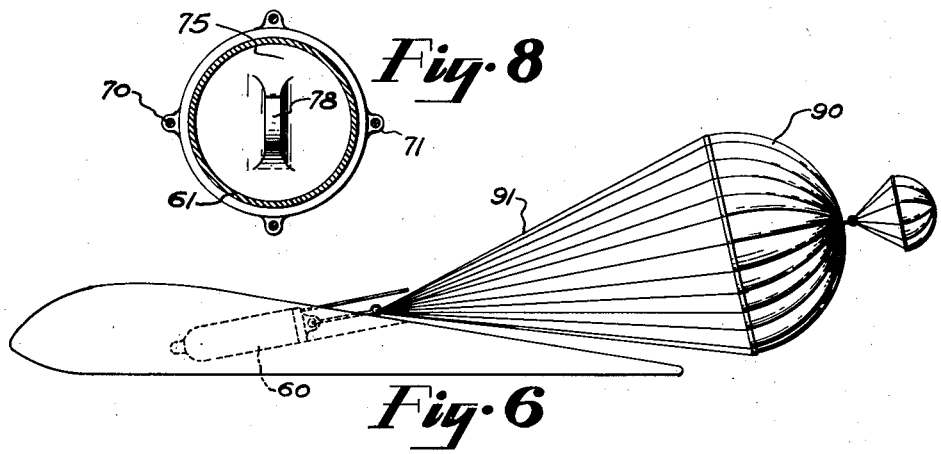
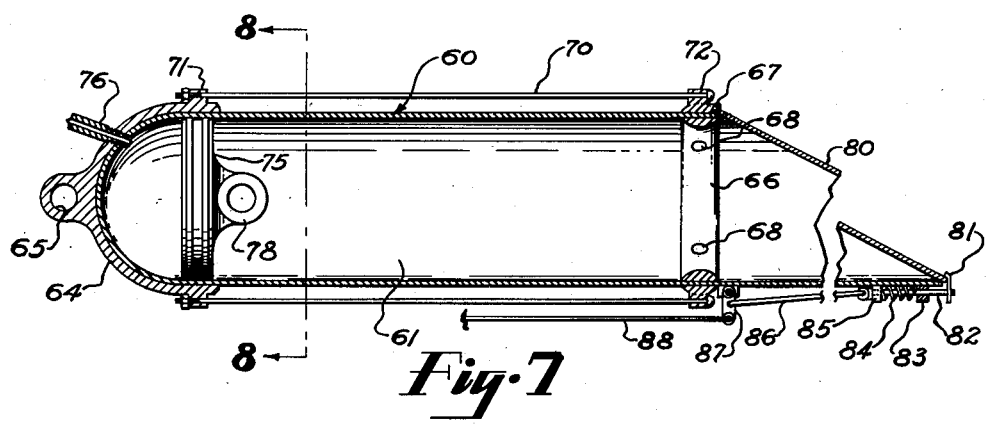
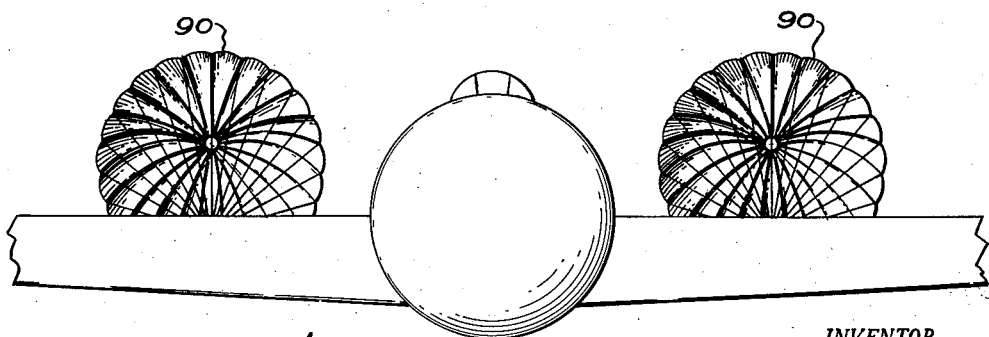
INVENTOR.
BRONISLAW J. DROZINSKI
BY Fay, Golrick & Fay
ATTORNEYS Patented Sept. 30, 1952

2,612,332

UNITED STATES PATENT OFFICE 2,612,332

AIRPLANE BRAKE

Bronislaw J. Drozinski, Cleveland, Ohio

Application August 17, 1948, Serial No. 44,639

2 Claims. (Cl. 244—113)

1

The present invention relates to braking systems for airplanes and more particularly to braking systems adapted to release parachute type air drags at the option of the aircraft pilot.

An object of the present invention is to provide braking systems for aircraft which will effectively reduce the speed of aircraft at the time of landing whereby high speed aircraft can safely be landed within relatively short spaces, such as on aircraft carriers.

Another object of the invention is to provide braking systems for aircraft which can be applied to existing aircraft without altering the structure thereof.

A further object of the invention is to provide a parachute type brake for airplanes which will positively eject the parachute from its container.

A still further object of the invention is to provide a parachute type brake for airplanes which can be located within the wing structure of the airplane.

Other objects and advantages of the invention will be apparent from the following description of preferred forms of the invention, reference being made to the accompanying drawings wherein:

Fig. 1 illustrates one form of braking system applied to the wing structure of an airplane;

Fig. 2 is a side view in elevation of a parachute type brake drag container;

Fig. 3 is a view in section taken on line 3—3 of Fig. 2;

Fig. 4 is a view in section taken on line 4—4 of Fig. 2;

Fig. 4a is a view in section taken on line 4a—4a of Fig. 2;

Fig. 5 is a fragmentary front view of an airplane having another form of braking system incorporated therein, the system being shown in operation;

Fig. 6 illustrates a side view of the second form of braking system as incorporated in the wing of an airplane;

Fig. 7 is a longitudinal sectional view of a parachute type brake drag container for installation within the confines of a wing; and, Fig. 8 is a view in section taken on line 8—8 of Fig. 7.

Referring now to Figs. 1 through 4, there is shown a parachute type drag container 10 which is adapted to be firmly secured to the top surface of the airplane wing illustrated at 11. The container 10 comprises a semi-cylindrical shell 12 supported at opposite ends by bands 13, which bands are provided with suitable bases 14 for attachment to the wing structure. The end portions of the shell 12 are suitably attached to the bands 13, as by welding.

The opposite ends of the container 10 are closed by dome shaped end caps 15 and 16, which extend into the bands 13 and are secured thereto as by welding. Caps 15 and 16 provide a streamlining effect to minimize air drag of the container.

It will be noted that the upper side of the semi-cylindrical shell 12 is open intermediate the bands 13 and this opening is adapted to be closed by two cover members 20 and 21, which members are in the form of segments of a cylinder so that when the covers are closed they, together with shell 12, form a cylindrical enclosure. The members 20 and 21 are rigidly attached to rods 22 and 23 which are journalled at opposite ends in the bands 13 and the cover members are adapted to be swung about their lower edges by rotation of the rods. Thus, the cover members may be moved to open and close the top of the shell 12.

The rotation of the rods 22 and 23 is controlled by the pilot by a remote control system which includes an actuating member 25 having a stem 26 and a yoke portion 27. The stem 26 projects downwardly through an opening in the forward end of the container 10 and beneath the surface of the wing for attachment to a suitable lever, not shown, which is operated by the pilot to raise or lower the member 25. One end of the yoke 27 is connected by a lever 28 to the rod 22 and the opposite end of the yoke is connected to rod 23 by a lever 29. The levers 28 and 29 are keyed to the respective rods 22 and 23 so that when levers 28 and 29 are rotated by vertical movement of member 25 the covers 20 and 21 will be swung to their open or closed positions. The ends of the levers 28 and 29 connected to yoke 27 are slotted to accommodate foreshortening of the distances between the axes of the respective rods and the points of connection with the yoke as the member 25 is moved upwardly. The connections between the yoke 27 and levers 28 and 29 are effected by pins 31 which loosely project through the slots of the levers, openings in the yoke and through slots 32 formed in a plate 33 attached to the interior of the end cap 15 and extending transversely of the axis of the container 10. It will be seen that the pins cooperate with the edges of the slots 32 to provide a vertical guide for the operating member 25.

A parachute 50 is adapted to be carried within the container 10 and the shrouds 51 thereof are anchored to a ring 52 formed integral with the plate 33. The parachute 50 is folded in such a manner that when the covers 20 and 21 are opened the parachute will be caught by the slip stream and immediately extended to the open position as illustrated in Fig. 1, thus effectively reducing the speed of the aircraft. It will be understood that the container 10 may be mounted at any suitable position on the plane, but preferably two such containers will be mounted on the wings of the airplane on opposite sides of the fuselage.

Referring now to Figs. 5 through 8, I have shown a second form of the invention wherein a parachute container 60 is mounted within the confines of the wing structure and mechanism is provided for projecting the parachute from the container outwardly above the wing surface.

The container 60 comprises a cylindrical member 61 closed at one end and having the plane of the opposite open end diagonal to the axis thereof, the angle of the plane of the end being determined by the position of the container in the wing and the contour of the upper surface of the wing whereby the plane of the opening will be substantially coincident with the plane of the wing adjacent to the end of the container.

A cap member 64 is secured over the closed end of member 61 and the cap is provided with a ring formation 65 for anchoring the container 60 to the internal structure of the wing. Inner and outer ring members 66 and 67 are attached to the member 61 adjacent to the open end thereof and these two rings are secured to one another and to the member 61 by rivets 68. The ring 67 is preferably tied to cap 64 by tierods 70 which extend through openings in lugs 71 and 72 formed on the cap 64 and ring 67, respectively.

A piston 75 is mounted in cylindrical member 61 and is adapted to be moved toward the open end of the member 61 and against ring 66 by pneumatic pressure entering the member 61 through a port 76 which is adapted to be connected by a suitable line, not shown, to an air pressure system in the plane and under the control of the pilot, the air system and control not being shown since such may be of conventional design. The piston 75 is provided with a ring formation 78 to which the shrouds of the parachute are attached.

The open end of member 61 is adapted to be closed by a cover plate 80 which is hinged at the upper point thereof to the ring 67, and the lower edge of the cover 80 is adapted to be locked in place by a latch member 81 which is mounted on a rod 82, which rod is slidable in a bushing 83 supported on the lower side of the member 61. A spring 84 is mounted between the lug 83 and a head 85 on the end of rod 82 for urging the latch member 81 to the latching position. Rod 82 may be moved to the unlatched position by the pilot through a linkage system which includes link 86 connected to one end of rod 82 and to a lever 87, which lever is adapted to be actuated by a link 88 suitably connected to a lever under the control of the pilot, but not shown.

A parachute 90, such as that shown in Fig. 6, is adapted to be carried within member 61 and the shrouds 91 thereof are anchored to the ring 78. The container 60 is mounted within the wing structure of the plane with the cover 80 extending flush with the surface of the wing adjacent to the opening of the container so that when the brake is not in operation there will be no wind resistance offered by the system. When it is desirable to use the brakes the pilot releases lock member 81 and applies pneumatic pressure for forcing the piston 75 outwardly thereby ejecting the parachute from the container and applying an air drag for reducing the speed of the aircraft. The piston will come to rest against the inner ring 66.

Preferably, a container 60 is provided on each side of the fuselage of the aircraft, although it is to be understood that more or fewer could be mounted on any desirable part or parts of the airplane.

The parachutes may be of any suitable size and they may include a small pilot parachute for assuring quick opening of the main parachute.

It will be understood that although I have described but two forms of the invention, it is to be understood that other forms might be adopted, all falling within the scope of the claims which follow.

I claim:

1. A parachute type brake mechanism for an airplane wing structure comprising a cylindrical chamber disposed within the wing and below the top surface thereof, said chamber extending substantially parallel to the line of flight and having the rear end thereof open to the exterior of the wing; a hinged cover for the opening; remote control mechanism for releasably securing the cover in closed position; a piston in said chamber adapted to be moved in response to pneumatic pressure in the forward end of the chamber; a parachute adapted to be carried in said chamber and anchored to said piston; and means for directing pneumatic pressure against the forward end of the piston for positively ejecting the parachute from the chamber into the air stream above the wing.

2. An airplane wing structure comprising a cylindrical chamber disposed within the wing and below the top surface thereof, said chamber extending substantially parallel to the line of flight and having the rear end thereof open to the exterior of the wing; a hinged cover for the opening, said cover extending substantially flush with the upper surface of the wing adjacent to said opening; remote control mechanism for releasably securing the cover in closed position; a piston in said chamber adapted to be moved in response to pneumatic pressure in the forward end of the chamber; a parachute adapted to be carried in said chamber and anchored to said piston; and means for directing pneumatic pressure against the forward end of the piston for positively ejecting the parachute from the chamber.

BRONISLAW J. DROZINSKI.

REFERENCES CITED

The following references are of record in the file of this patent:

UNITED STATES PATENTS

| Number | Name | Date |
|---|---|---|
| 1,037,943 | Lowry | Sept. 10, 1912 |
| 1,331,705 | Greenfield | Feb. 24, 1920 |
| 1,569,391 | Pearl | Jan. 12, 1926 |
| 1,782,134 | Coplen | Nov. 18, 1930 |
| 1,856,397 | Motter | May 3, 1932 |
| 2,392,448 | Atherton | Jan. 8, 1946 |

FOREIGN PATENTS

| Number | Country | Date |
|---|---|---|
| 432,801 | France | Oct. 12, 1911 |